(12) United States Patent
Govyadinov et al.

(10) Patent No.: US 10,197,188 B2
(45) Date of Patent: Feb. 5, 2019

(54) MICROFLUIDIC VALVE

(71) Applicant: Hewlett-Packard Development Company, L.P., Houston, TX (US)

(72) Inventors: Alexander Govyadinov, Corvallis, OR (US); Erik D Torniainen, Corvallis, OR (US); David P Markel, Corvallis, OR (US); Pavel Kornilovich, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 207 days.

(21) Appl. No.: 15/503,664

(22) PCT Filed: Aug. 15, 2014

(86) PCT No.: PCT/US2014/051289
§ 371 (c)(1),
(2) Date: Feb. 13, 2017

(87) PCT Pub. No.: WO2016/024998
PCT Pub. Date: Feb. 18, 2016

(65) Prior Publication Data
US 2017/0276259 A1 Sep. 28, 2017

(51) Int. Cl.
*B01L 3/00* (2006.01)
*F04B 53/10* (2006.01)
*F04F 7/00* (2006.01)
*F16K 99/00* (2006.01)
*F17D 1/00* (2006.01)

(52) U.S. Cl.
CPC ...... *F16K 99/0021* (2013.01); *B01L 3/50273* (2013.01); *B01L 3/502738* (2013.01); *F04B 53/10* (2013.01); *F04F 7/00* (2013.01); *F16K 99/0042* (2013.01); *F16K 99/0055* (2013.01); *B01L 2300/023* (2013.01); *B01L 2300/0864* (2013.01); *B01L 2400/0442* (2013.01);
(Continued)

(58) Field of Classification Search
CPC ....... B01L 2300/023; B01L 2300/0864; B01L 2400/0442; B01L 2400/0622; B01L 3/50273; B01L 3/502738; F04B 53/10; F04F 7/00; F16K 2099/0084; F16K 99/0021; F16K 99/0042; F16K 99/0055
See application file for complete search history.

(56) References Cited

U.S. PATENT DOCUMENTS 6,615,856 B2   9/2003   McNeely et al.
7,163,026 B2   1/2007   Takeda et al.
(Continued)

OTHER PUBLICATIONS

Dan, Jiang, and Li Song-Jing. "The dynamic characteristics of a valve-less micropump." Chinese Physics B 21.7 (2012): 074701.
(Continued)

*Primary Examiner* — Jennifer Wecker
(74) *Attorney, Agent, or Firm* — HP Inc. Patent Department

(57) ABSTRACT

In an example implementation, a method of controlling a microfluidic valve includes activating a first inertial pump at a first frequency, and a second inertial pump at a second frequency to create a first fluid flow pattern within a microfluidic valve. The method also includes adjusting at least one of the first frequency and the second frequency to change the first fluid flow pattern to a second fluid flow pattern.

15 Claims, 6 Drawing Sheets

(52) U.S. Cl.
CPC ........... *B01L 2400/0622* (2013.01); *F16K 2099/0084* (2013.01)

(56) References Cited

U.S. PATENT DOCUMENTS

| | | |
|---|---|---|
| 7,727,478 B2 | 6/2010 | Higashino et al. |
| 2004/0146409 A1 | 7/2004 | Lee et al. |
| 2012/0244604 A1 | 9/2012 | Kornilovich et al. |
| 2013/0061936 A1* | 3/2013 | Govyadinov ........ B41J 2/14233 137/13 |
| 2016/0341337 A1 | 11/2016 | Govyadinov et al. |

OTHER PUBLICATIONS

Kolandouz, E. M., et al. "Performance of piezoelectrically actuated micropump with different driving voltage shapes and frequencies," Scientia Iranica. Transaction B, Mechanical Engineering 21 5 (2014): 1635.

Meyvantsson, Ivar et al., 'Automated cell culture in high density tubeless rnicrofluidic device arrays', Lab on a Chip, 2008, vol. 8, No. 5, pp. 717-724 See the whole document.

Torniainen, Erik D. et al., 'Bubble-driven inertial micropump', Physics of Fluids, 2012, vol. 24, No. 12, pp. 122003-1-122003-18 See the whole document.

* cited by examiner

MICROFLUIDIC VALVE

BACKGROUND

Microfluidic devices provide miniaturized environments with fluid-carrying channels that enable the control and manipulation of very small fluid sample volumes that can range, for example, from a few microliters to a few femtoliters ($10^{-6}$-$10^{-15}$ liter). Such devices are used, for example, in medical diagnostics, DNA forensics, and "lab-on-a-chip" chemical analyzers, and they can be fabricated using common microfabrication techniques such as photolithography.

Valves in fluidic systems are used to minimize or eliminate the flow of fluid in a specified direction. Valves in microfluidic systems often require specific materials that have limited material compatibility, and that may be expensive and/or difficult to manufacture. Valves in microfluidic systems often include moving parts, which reduces their reliability.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

Figure 1:
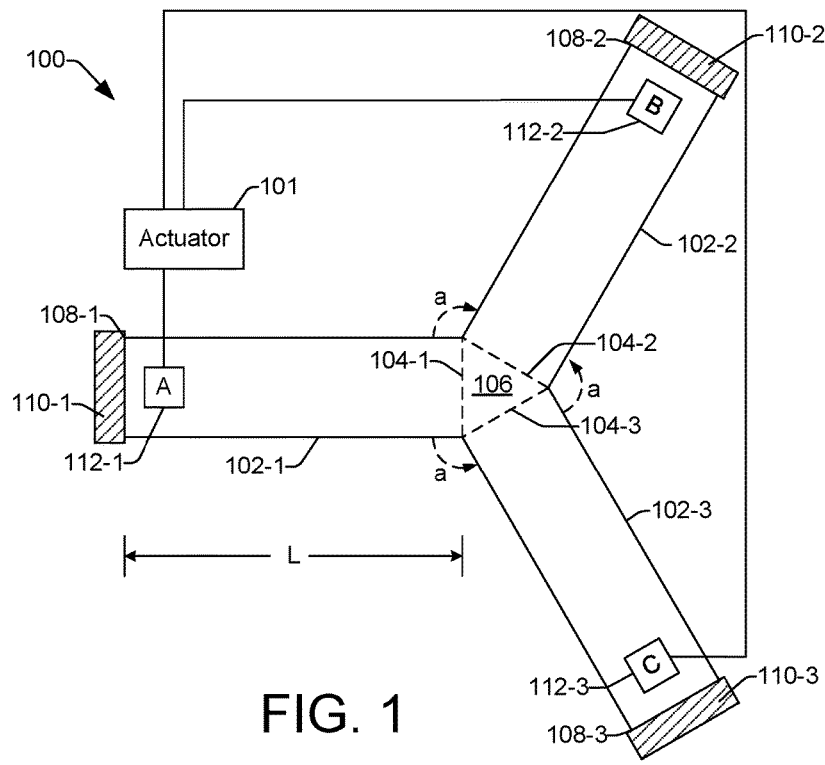
FIG. 1 shows an example of a microfluidic valve that uses inertial pumps to control the flow of fluid through microfluidic channels.

FIG. 1 shows an example of a microfluidic valve 100. As will be described hereafter, a microfluidic valve uses inertial pumps to control the flow of fluid through microfluidic channels between reservoirs or chambers. In some examples, microfluidic valves control the flow of fluid by activating inertial pumps at varying frequencies with respect to one another. Thus, a ratio of activation frequency between inertial pumps can be adjusted to dynamically control the flow of fluid within the valve. Adjusting the ratio of activation frequencies can result in various fluid flow patterns through channels within the valve. In general, compared to prior microfluidic valves, various implementations of a microfluidic valve 100 offer improved fluid flow control, including valve scaling and reduced pressure loss, while also reducing or omitting moving parts, enhancing reliability, and lowering cost.

Microfluidic valve 100 includes three channels 102 (illustrated as channels 102-1, 102-2, 102-3) having first channel ends 104 (illustrated with dashed lines as first channel ends 104-1, 104-2, 104-3) that intersect one another and are fluidically coupled at a fluid intersection 106. Each channel 102 extends away from the channel intersection 106 at an angle, "a", toward a second channel end 108 (illustrated as second channel ends 108-1, 108-2, 108-3). Microfluidic valve 100 is generally uniform in that the lengths, "L", of the channels 102 are equal, as are the angles "a" at which the channels 102 extend away from the intersection 106. For example, in FIG. 1, the angle "a" for each channel 102 extending away from intersection 106 can be 120°. It is noteworthy that while the examples provided generally refer to a microfluidic valve 100 that is uniform (i.e., with uniform channel lengths, angles, widths), the concepts discussed herein, including controlling fluid flow through channels using frequency controlled inertial pumps/valves, are equally applicable to non-uniform microfluidic valves having unequal channel lengths, unequal angles, unequal widths, and so on. The use of uniform microfluidic valves 100 in the examples is primarily for the purpose of simplifying the description and illustrations.

At the second channel end 108 for each channel 102, the microfluidic valve 100 may include a reservoir or chamber 110 (illustrated as chambers 110-1, 110-2, 110-3) to receive fluid from, and/or provide fluid to, a respective channel 102. While the chambers 110 in FIG. 1 are shown to have a slightly larger width than the channels 102, in an actual microfluidic valve 100, the chambers 110 can be significantly wider than the width of the channels 102. Toward the second channel end 108 of each channel 102, the microfluidic valve 100 includes an inertial pump 112 (illustrated as inertial pumps 112-1, 112-2, 112-3, and "A", "B", "C", respectively). Each inertial pump 112 comprises a pumping device located within a respective channel 102 proximate to chamber 110 and distant to intersection 106. In other words, inertial pump 112 is spaced from chamber 110 by a distance less than one half of the length of the total fluid path between the first channel end 104 and the second channel end 108. Inertial pump 112 utilizes inertia and momentum within a channel 102 to produce fluid flow. For purposes of this disclosure, the term "inertial pump" refers to a pumping device that initially drives fluid in both directions within a channel 102, but wherein the pumping device is asymmetrically positioned between the channel ends (104 and 108) such that the end result of a pumping event is fluid being driven in a direction toward the most distant of the two channel ends, which in the described examples is toward the first channel end 104.

In microfluidic valve 100, each inertial pump 112 can be selectively actuated by an actuator 101 to produce fluid flow in a direction that opposes fluid flow resulting from pressure caused by the actuation of another inertial pump, or fluid flow resulting from a pressure gradient coming from within a chamber 110, the atmosphere, and so on. In some examples, an inertial pump 112 can be actuated by actuator 101 to an extent that it stops or prevents fluid under pressure from flowing past it. In such cases, the inertial pump 112 acts as a closed valve within a channel 102 and prevents fluid under pressure from flowing into a chamber 110 at its second channel end 108. In other examples, an inertial pump 112 can be actuated by actuator 101 to an extent that it reduces the rate at which fluid under pressure flows past it. In such cases, the inertial pump 112 acts as a partially opened valve within a channel 102 and allows some fluid under pressure to flow into a chamber 110 at its second channel end 108. In general, controlling actuation frequencies of inertial pumps 112 by actuator 101 can create a variety of different fluid flow patterns through channels within the valve 100. Actuator 101 is discussed in greater detail herein below.

In one implementation, inertial pump 112 comprises a bubble pump. A bubble pump is a pump that produces an initially expanding bubble to move or drive adjacent fluid away from the bubble. One example of a bubble pump comprises a micro-heater, such as a thermal inkjet (TIJ) pump. A TIJ pump utilizes an electrical resistor through which electric current is passed. In some examples a TIJ pump may use multiple resistors. The heat produced by the resistor as electric current passes through it vaporizes the fluid that is proximate to or surrounding the resistor, which creates a bubble. As the bubble expands, it drives adjacent fluid away from itself and the resistor.

FIGS. 2A-2F illustrate the operation of an example implementation of microfluidic valve 100 where an inertial pump 112 such as inertial pump B (112-2) of FIG. 1, comprises a thermal bubble type pump. While the microfluidic valve 100 shown in FIGS. 2A-2F is intended to represent the example three-channel, microfluidic valve 100 of FIG. 1, for the purpose of this description, only one of the three channels is shown. FIGS. 2A-2F illustrate an expansion-collapse cycle of a single actuation of the bubble pump of an inertial pump 112 within one channel 102 of a microfluidic valve 100. Such an expansion-collapse cycle can be referred to as a "pumping event", and in some examples an expansion-collapse cycle may comprise all or part of a "pumping event". The single expansion-collapse cycle results in force being applied to fluid in a direction away from the second channel end 108 closest to inertial pump 112, B, and away from chamber 110. The single expansion-collapse cycle (pumping event) creates fluid flow toward the intersection 106 (i.e., toward the first channel end 104) that will oppose and control fluid that may be flowing from the intersection 106 under pressure from another inertial pump or other pressure gradient within the microfluidic valve 100.

FIG. 2A illustrates one channel 102 of microfluidic valve 100 in a starting state in which the fluid within channel 102 is at rest or steady state. FIG. 2B illustrates channel 102 upon a single actuation of the bubble pump serving as an inertial pump 112. As shown by FIG. 2B, the bubble pump generates a high-pressure vapor bubble 200. The bubble 200 provides a positive pressure difference that pushes fluid away from the bubble 200 and inertial pump 112 in both directions. As shown by FIG. 2C, the vapor pressure of bubble 200 quickly drops below atmospheric and the fluid decelerates under a negative pressure difference while continuing to move as a result of inertia. As shown by FIG. 2D, the fluid in the short arm 202 of channel 102 (i.e., to the right of inertial pump B, 112) reverses direction or turns around upon reaching the larger interface of chamber 110, which is at the second channel end 108. At the same time, the fluid in the longer arm 204 of channel 102 (i.e., to the left of inertial pump B, 112) continues to move toward intersection 106, which is at the first channel end 104. As shown by FIG. 2E, the fluid in the longer arm 204 moving toward intersection 106 reaches the intersection 106 (i.e., the first channel end 104) and turns around or reverses direction such that the two fluidic columns collide at a collision point, which is a point that has shifted away from the inertial pump B, 112 (i.e., the starting point of the initial bubble expansion), toward the intersection 106. As shown by FIG. 2F, because the fluid flowing from the shorter arm 202 has a greater amount of momentum at the point of collision, the total post collapse momentum is nonzero, and the fluid is ultimately driven in a direction toward the intersection 106 (i.e., the first channel end 104), which will oppose (i.e., stop or reduce) fluid being driven under pressure from the intersection 106, either from another inertial pump or other pressure gradient.

The rate at which fluid is driven by inertial pump 112 depends on the power and frequency of the inertial pump 112, the distance the inertial pump 112 is spaced from the end of the channel 102, the cross-sectional area or width of the chamber 110 relative to the cross-sectional area or width of the channel 102, and the viscosity of the fluid to be pumped. The movement of fluid by inertial pump 112 as a result of inertia is greater than the resistance against such movement due to friction. In some examples, an inertial pump 112 can have an initial velocity of at least 1 m/s to 10 m/s, and nominally as high as 20 m/s. In some examples, inertial pump 112 comprises a thermal inkjet resistor that produces a vapor bubble that propels adjacent fluid at an initial velocity of at least 1 m/s to 10 m/s. In some examples, the chamber 110 proximate to the inertial pump 112, can have a cross-sectional area or width of at least 5 times, and nominally at least 10 times, the cross-sectional area or width of the channel 102. In some examples channel 102 has a width on the order of 10 to 50 µm, while chamber 110 has a width on the order of 200 to 500 µm (measured perpendicular to the axial direction of channel 102 at the interface of chamber 110). In other examples, the difference in widths of channel 102 and chamber 110 may have other values.

Figure 2:
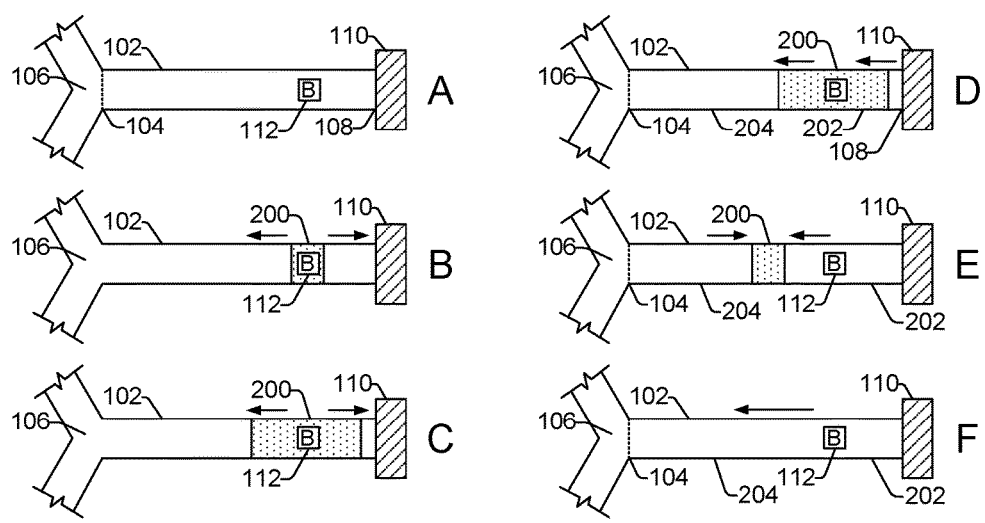
FIGS. 2A-2F illustrate an example operation of an example implementation of a microfluidic valve, where an inertial pump comprises a bubble pump.

Although FIG. 2 illustrates an example of microfluidic valve 100 where the inertial pump 112 comprises a bubble pump, in other examples the inertial pump 112 may comprise other pumping mechanisms or devices that initially drive fluid in both directions within a channel, but wherein the pumping device is asymmetrically positioned between larger chambers or reservoirs such that the end result is fluid being driven in a direction toward the longer arm of the channel. For example, inertial pump 112 may comprise a flexible or deflectable membrane along a side of channel 102 proximate to chamber 110 and distant intersection 106, wherein the membrane is deflectable by electrical, magnetic, mechanical or other forces to initially drive fluid in both directions within the relatively narrow channel 102. In some examples, the inertial pump 112 may comprise a piezo element (e.g., made of PZT) deflectable membrane.

As mentioned above, the rate at which fluid is driven by an inertial pump 112 depends in part on the frequency of the inertial pump 112. Therefore, varying the activation frequency of an inertial pump 112 in a channel 102 can control the degree to which fluid will flow through the channel. For example, fluid flow into a channel 102 can be stopped or reduced by adjusting the activation frequency of the inertial pump 112 in the channel. Applying this to a microfluidic valve 100 as in FIG. 1, fluid flow throughout the three channels 102 of the valve can be controlled merely by controlling the frequency of activation of each inertial pump 112. In any given microfluidic valve 100 with three channels 102, for example, a ratio of activation frequency between two inertial pumps 112 can be adjusted to create fluid flow from one channel to a second channel, while blocking fluid flow into the third channel. Any manner of flow to and from any of the channels can be controlled by adjusting the ratio of activation frequencies between the inertial pumps 112.

Figure 3:
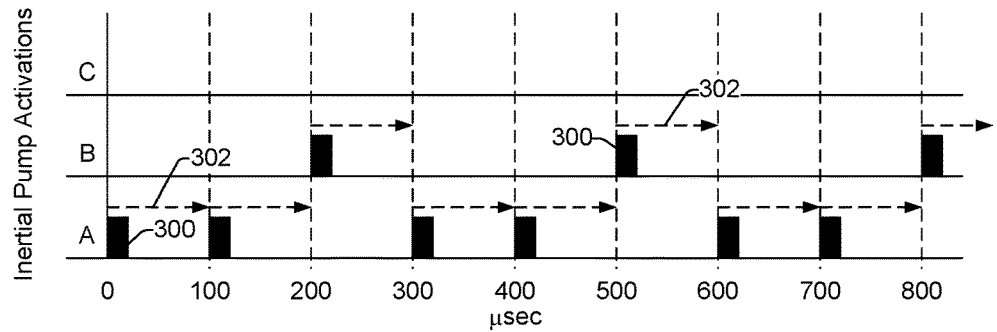
FIG. 3 illustrates a chart showing an example of inertial pump activations taking place among three inertial pumps of a microfluidic valve.
Figure 4:
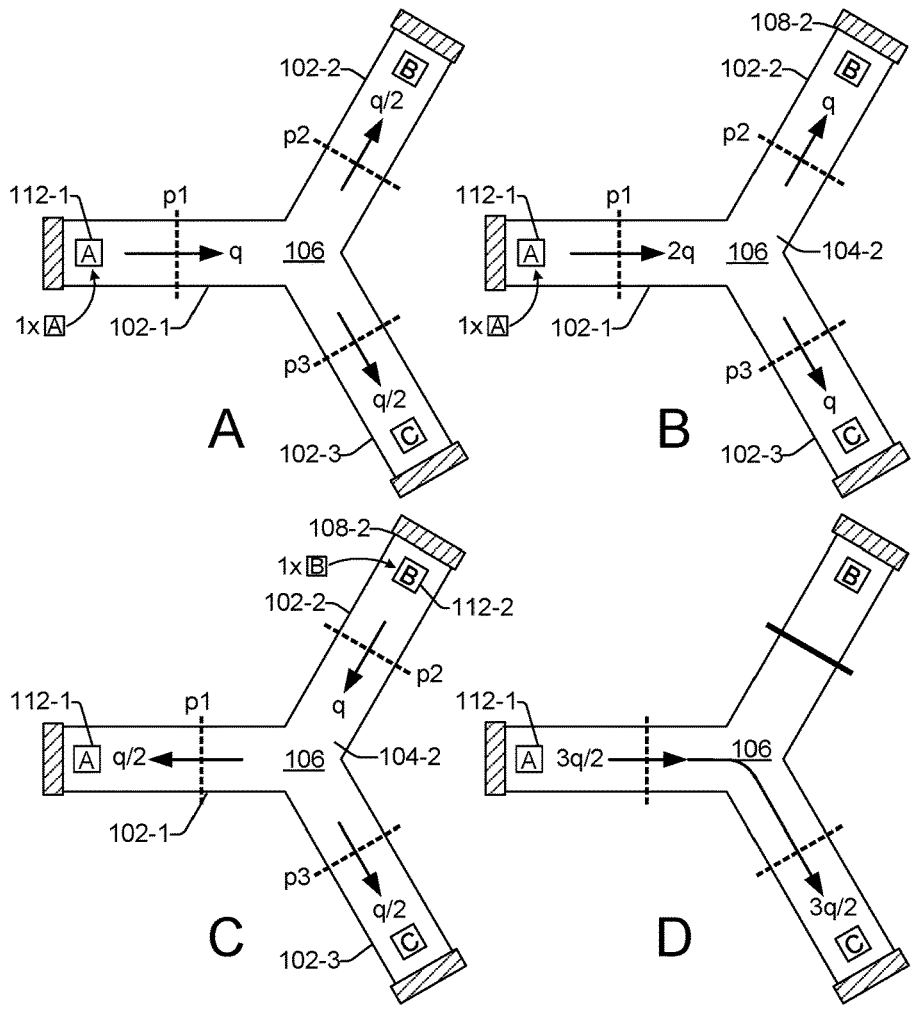
FIG. 4 shows an example progression or pattern of fluid flow through a microfluidic valve that corresponds with the inertial pump activations shown in FIG. 3.

FIG. 3 illustrates a chart showing an example of inertial pump activations 300 taking place among three inertial pumps 112 (inertial pumps A, B, and C) of a microfluidic valve 100, such as valve 100 of FIG. 1, to control fluid flow within the three channels 102 of the microfluidic valve 100. FIG. 4 shows an example progression or pattern of fluid flow through a microfluidic valve 100 that corresponds with the inertial pump activations shown in FIG. 3. Referring now to FIGS. 1, 3, and 4, an inertial pump 112-1, A, in channel 102-1 is activated a single time at time zero. As shown at FIG. 4A, generates fluid flow "q" that flows past imaginary plane "p1", and toward valve intersection 106. For a uniform microfluidic valve 100, flow q is divided roughly evenly between channels 102-2 and 102-3 as it flows through intersection 106. Thus, the single activation of inertial pump 112-1, A, generates q/2 fluid flow down each channel 102-2 and 102-3.

Upon the activation of inertial pump 112-1, A, and prior to any subsequent pump activation, a time delay 302 is implemented. In general, a time delay 302 allows a current pumping event initiated by the activation of an inertial pump to be completed, or "settled", before another pumping event is initiated. The time delay minimizes interactions and interference between consecutive pumping events and effectively causes the microfluidic valve 100 to behave as a linear system in which the fluid flow responses created by the pumping events will sum together according to the principle of superposition. The time delay 302 enables the drive bubble created by the inertial pump activation to fully collapse and the fluid flow to settle before a next pumping event is initiated. The time for the expansion and collapse of the drive bubble is on the order of 5-20 μsec. The time for the fluid flow movement to settle in a net flow direction can vary, and in some examples can be on the order of 80 μsec. In general, a pumping event includes the expansion and collapse of the drive bubble, as well as the settling of the fluid in a net flow direction. Therefore, the time delay 302 between pumping events, or inertial pump activations, is typically on the order of between 50-100 μsec, but is not limited to this range. Other time delays are possible. As shown in the example of FIG. 3, the activation of each pumping event occurs on a time interval of approximately 100 μsec.

Following the time delay 302 implemented at the start of the first inertial pump activation of pump 112-1, A, a second inertial pump activation occurs at approximately 100 μsec, as shown in FIGS. 3 and 4B. The second inertial pump activation is another activation of pump 112-1, A. As with the first inertial pump activation of pump 112-1, A, the second inertial pump activation of pump 112-1, A, generates fluid flow "q" that flows past imaginary plane "p1", and toward valve intersection 106. As shown in FIG. 4B, and as mentioned above, the fluid flow of the first and second pump activations of pump 112-1, A, combine through superposition (enabled by time delay 302), resulting in a fluid flow of 2q flowing past plane, p1, and a divided fluid flow of q flowing into channels 102-2 and 102-3, past planes p2 and p3, respectively.

Following another time delay 302, a third inertial pump activation occurs at approximately 200 μsec, as shown in FIG. 3. The third inertial pump activation is an activation of inertial pump 112-2, B. Because microfluidic valve 100 is generally uniform, having channels of equal length, L, channel angles "a" that are equal, inertial pumps 112 using the same sized heating resistors, and so on, the activation of inertial pump 112-2, B, generates a fluid flow "q" that flows away from second channel end 108-2, past imaginary plane "p2", and toward the first channel end 104-2 at valve intersection 106. As shown in FIG. 4C, the fluid flow q from the single activation of inertial pump 112-2, B, is divided roughly evenly between channels 102-1 and 102-3 as it flows through intersection 106. Thus, the single activation of inertial pump 112-2, B, generates q/2 fluid flow down each channel 102-1 and 102-3, past planes p1 and p3, respectively.

FIG. 4D shows the resulting flow generated by the first three inertial pump activations of FIG. 3, where inertial pump 112-1, A, is activated twice, followed by a single activation of inertial pump 112-2, B. As noted above, introducing a time delay 302 between each pump activation event results in a summing together of the fluid flow responses according to the principle of superposition. Accordingly, the sequential activation of inertial pump 112-1, A, at a frequency of 2, followed sequentially by the activation of inertial pump 112-2, B, at a frequency of 1, results in a fluid flow of 3q/2 from inertial pump 112-1, A, past plane p1, through intersection 106, and through channel 102-3 past plane p3. A corresponding result is that inertial pump 112-2, B, acts as a closed valve that stops the flow of fluid coming from channel 102-1 under pressure from inertial pump 112-1, A, and redirects the flow back to channels 102-1 and 102-3. Thus, the ratio of activation frequency of 2/1 between inertial pump 112-1, A, and inertial pump 112-2, B, is an example of a ratio that can be implemented in a microfluidic valve 100 to control fluid flow through the valve.

As noted above, microfluidic valve 100 is generally considered to be a uniform valve, in that channels 102 are of equal length, L, the channel angles "a" are equal, the inertial pumps 112 use the same sized heating resistors, and so on. The assumed uniformity of microfluidic valve 100 enables the simplistic fluid flow example discussed above with regard to FIGS. 3 and 4. In other examples, however, a microfluidic valve 100 may be non-uniform. For example, a manufacturing anomaly may cause the length of the channels to be non-uniform, or the angles at which the channels extend away from the intersection 106 to be non-uniform angles. In such cases, a ratio of activation frequency of 2/1 between inertial pump 112-1, A, and inertial pump 112-2, B, would likely not produce the same flow results noted in the above example. For example, such non-uniformities may cause the unintended flow of an amount of fluid through channel 102-2. However, in such cases, the ratio of activation frequency between inertial pump 112-1, A, and inertial pump 112-2, B, can be adjusted to compensate for the non-uniformities in the valve 100, and thereby maintain the intended fluid flow throughout the valve.

Figure 5:
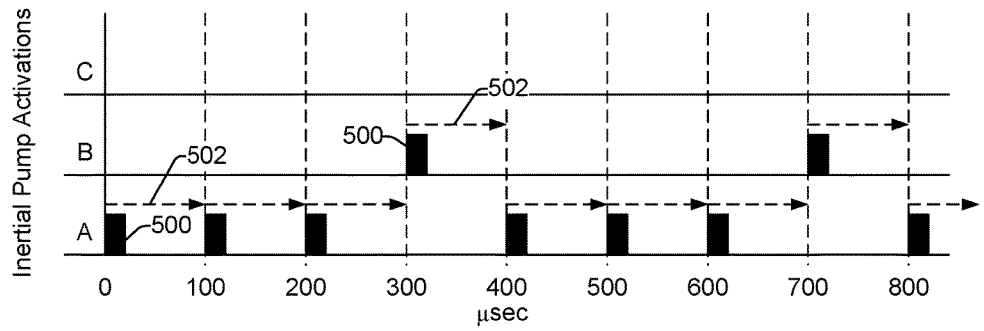
FIG. 5 illustrates a chart showing another example of inertial pump activations taking place among three inertial pumps of a microfluidic valve.
Figure 6:
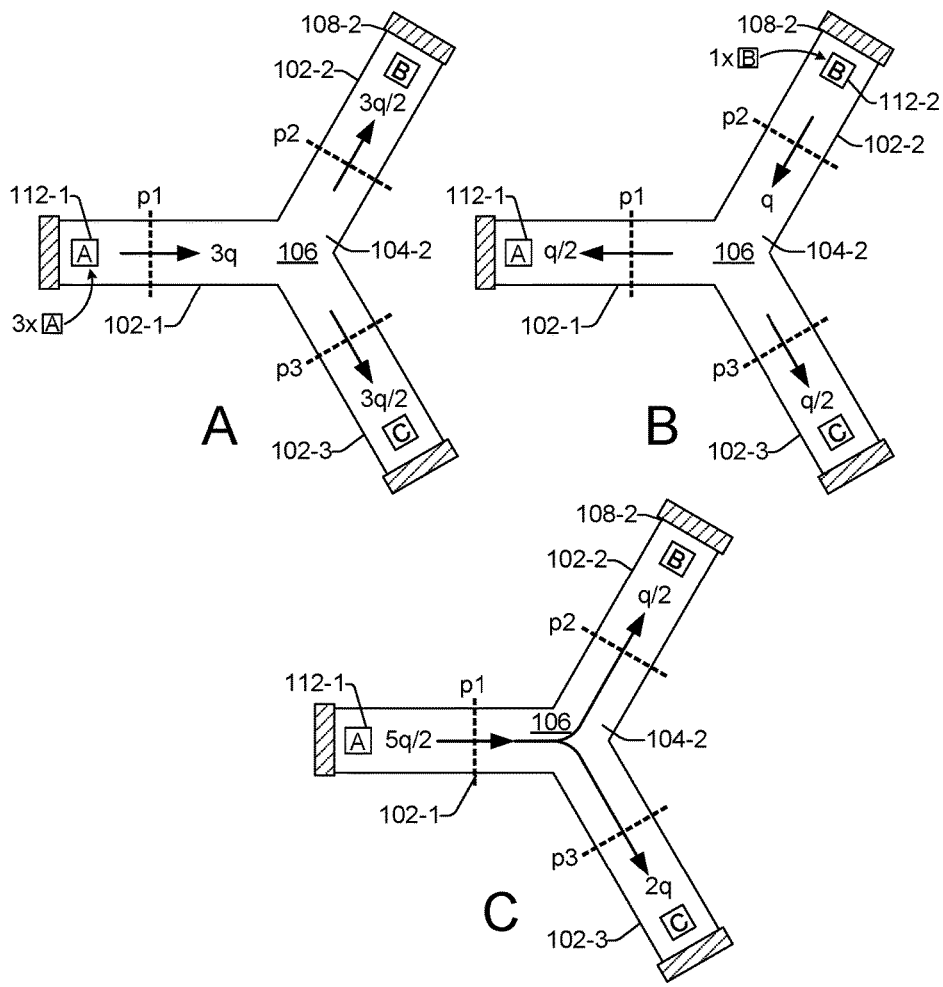
FIG. 6 shows an example progression or pattern of fluid flow through a microfluidic valve that corresponds with the inertial pump activations shown in FIG. 5.

FIG. 5 illustrates a chart showing another example of inertial pump activations 500 taking place among three inertial pumps 112 (inertial pumps A, B, and C) of a microfluidic valve 100, such as valve 100 of FIG. 1, to control fluid flow within the three channels 102 of the microfluidic valve 100. FIG. 6 shows an example progression or pattern of fluid flow through a microfluidic valve 100 that corresponds with the inertial pump activations shown in FIG. 5. In general, FIGS. 5 and 6 provide an example that illustrates a fluid flow pattern through microfluidic valve 100 that varies from the previous example in FIGS. 3 and 4, strictly because of the application of a different ratio of activation frequency between inertial pump 112-1, A, and inertial pump 112-2, B. It should be noted that, while inertial pumps A and B are used in the examples, other combinations of pumps could just as readily be used to demonstrate the control of fluid flow through the microfluidic valve 100 based on ratio of activation frequencies.

Referring now to FIGS. 1, 5, and 6, an inertial pump 112-1, A, in channel 102-1 is activated 500 three times in a row, first at time zero, and again at 100 µsec and 200 µsec. Each activation 500 is separated by a time interval 502, and as shown in FIG. 6A, the flow from the three activations 500 combine by superposition resulting in a flow of 3q past imaginary plane, "p1", and toward valve intersection 106. The fluid flow 3q is divided roughly evenly between channels 102-2 and 102-3 as it flows through intersection 106. Thus, the three activations of inertial pump 112-1, A, generate 3q/2 fluid flow down each channel 102-2 and 102-3. Thereafter, following another time delay 502, inertial pump 112-2, B, in channel 102-2 is activated one time, resulting in a fluid flow "q" that flows away from second channel end 108-2, past imaginary plane "p2", and toward the first channel end 104-2 at valve intersection 106. As shown in FIG. 6B, the fluid flow q from the single activation of inertial pump 112-2, B, is divided roughly evenly between channels 102-1 and 102-3 as it flows through intersection 106. Thus, the single activation of inertial pump 112-2, B, generates q/2 fluid flow down each channel 102-1 and 102-3, past planes p1 and p3, respectively.

FIG. 6C shows the resulting fluid flow pattern generated by the first four inertial pump activations of FIG. 5, where inertial pump 112-1, A, is activated three times, followed by a single activation of inertial pump 112-2, B. As noted above, introducing a time delay 302, 502, between each pump activation event results in a summing together of the fluid flow responses according to the principle of superposition. Accordingly, the sequential activation of inertial pump 112-1, A, at a frequency of 3, followed sequentially by the activation of inertial pump 112-2, B, at a frequency of 1, results in a fluid flow of 5q/2 from inertial pump 112-1, A, past plane p1, and through intersection 106. The resulting ratio of activation frequency between pumps A and B further result in a flow of q/2 through channel 102-2, past plane p2, and a flow of 2 q through channel 102-3, past plane p3. Thus, while the prior example in FIGS. 3 and 4 illustrated a ratio of activation frequencies between inertial pumps A and B that stopped fluid flow through channel 102-2, the example in FIGS. 5 and 6 illustrate a ratio of activation frequencies between inertial pumps A and B that reduce fluid flow through channel 102-2.

Figure 7:
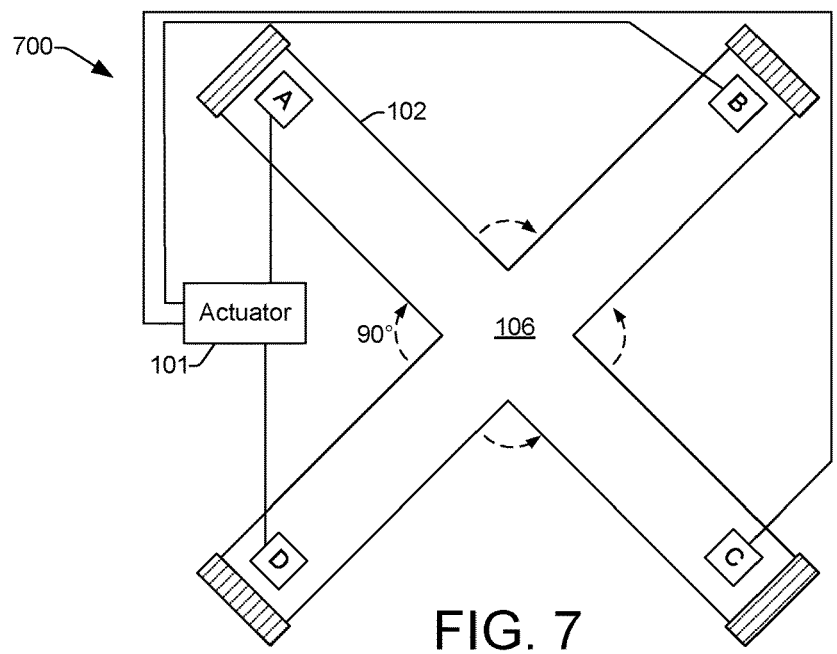
FIGS. 7 and 8 illustrate additional examples of microfluidic valves that operate under the same principles described with regard to the three channel microfluidic valve in FIGS. 1-6.
Figure 8:
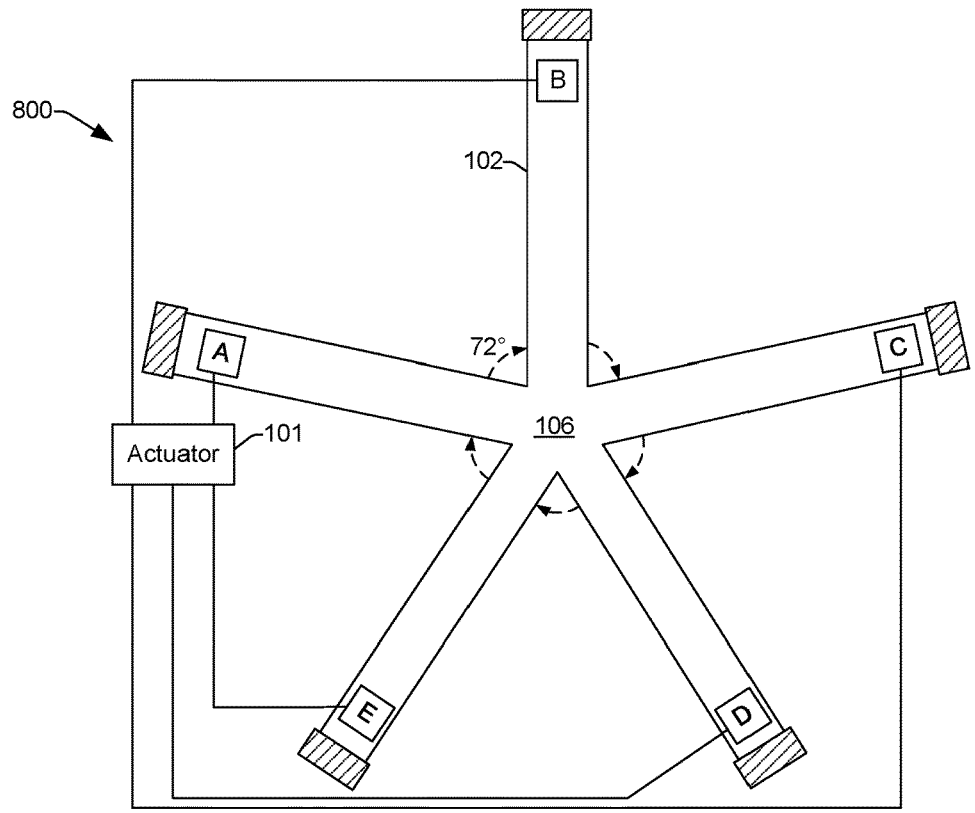

FIGS. 7 and 8 illustrate additional examples of microfluidic valves that operate under the same principles described above with regard to the three channel microfluidic valve 100 in FIGS. 1-6. Such principles are applicable to any similarly suitable microfluidic valve that comprises three or more fluidic channels 102. Thus, the microfluidic valves 700 and 800 shown in FIGS. 7 and 8, respectively, comprise different numbers of channels 102 exceeding three channels. Like the microfluidic valve 100 discussed above, the channels 102 in microfluidic valves 700 and 800 of FIGS. 7 and 8 have a uniform length and width, the angles of the channels as they extend away from the intersection 106 are equal, the sizes of inertial pumps A-E are uniform, and so on.

Figure 9:
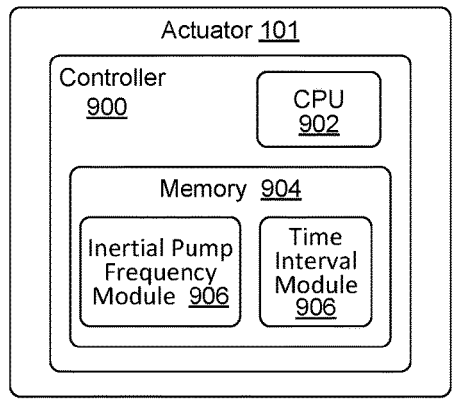
FIG. 9 shows an example of an actuator capable of selectively actuating inertial pumps in different orders and at different adjustable ratios of activation frequencies relative to one another to control fluid flow through a microfluidic valve.

FIG. 9 shows an example of an actuator 101 capable of selectively actuating inertial pumps 112 in different orders and at different adjustable ratios of activation frequencies relative to one another to control fluid flow through a microfluidic valve, such as microfluidic valve 100. Actuator 101 comprises a controller 900 to selectively actuate pumps 112 in varying orders and frequencies to generate and/or control or valve fluid flow within channels 102 of a microfluidic valve 100. Controller 900 comprises a processor (CPU) 902 and a memory 904, and may additionally include firmware and other electronics for communicating with and controlling the inertial pumps 112 of a microfluidic valve 100. Processor 902 is intended to include any presently developed or future developed processing unit that executes sequences of instructions contained in a non-transitory memory. Execution of the sequences of instructions causes the processing unit to perform steps such as generating control signals. The instructions can be loaded in a random access memory (RAM) for execution by the processing unit from a read only memory (ROM), a mass storage device, or some other persistent storage. In other examples, hard-wired circuitry may be used in place of or in combination with software instructions to implement the functions described. For example, controller 900 may be embodied as part of one or more application-specific integrated circuits (ASICs). Unless otherwise indicated, controller 900 is not limited to any specific combination of hardware circuitry and software, nor to any particular source for the instructions executed by the processing unit.

Memory 904 can include both volatile (i.e., RAM) and nonvolatile (e.g., ROM, hard disk, optical disc, CD-ROM, magnetic tape, flash memory, etc.) memory components. The components of memory 904 comprise non-transitory, machine-readable (e.g., computer/processor-readable) media that provide for the storage of machine-readable coded program instructions, data structures, program instruction modules, and other data for controlling fluid flow in a microfluidic valve 100 through selective actuation of inertial pumps 112. For example, inertial pump frequency module 906 comprises program instructions stored in memory 904 and executable on processor 902 to cause the actuator 900 to selectively initiate or activate inertial pumps 112 to control fluid flow through microfluidic valve 100. In addition, memory 904 includes a time interval module 908 having instructions executable on processor 902 to enable the adjustment of a time interval that occurs between each activation of an inertial pump 112 on microfluidic valve 100. The program instructions, data structures, and modules stored in memory 904 may be part of an installation package that can be executed by processor 902 to implement various examples, such as examples discussed herein. Thus, memory 904 may be a portable medium such as a CD, DVD, or flash drive, or a memory maintained by a server from which the installation package can be downloaded and installed. In another example, the program instructions, data structures, and modules stored in memory 904 may be part of an application or applications already installed, in which case memory 904 may include integrated memory such as a hard drive.

Figure 10:
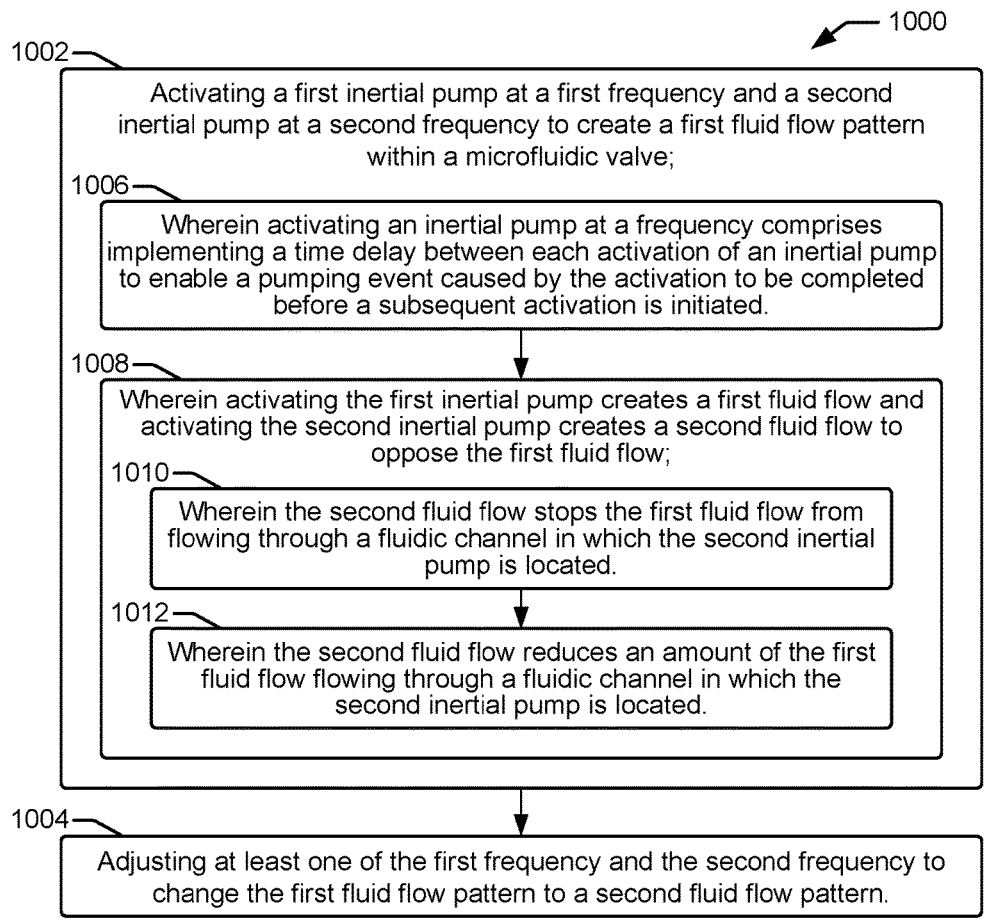
FIGS. 10 and 11 show flow diagrams that illustrate example methods related to a microfluidic valve that uses frequency control of inertial pumps to control the flow of fluid through microfluidic channels.
Figure 11:
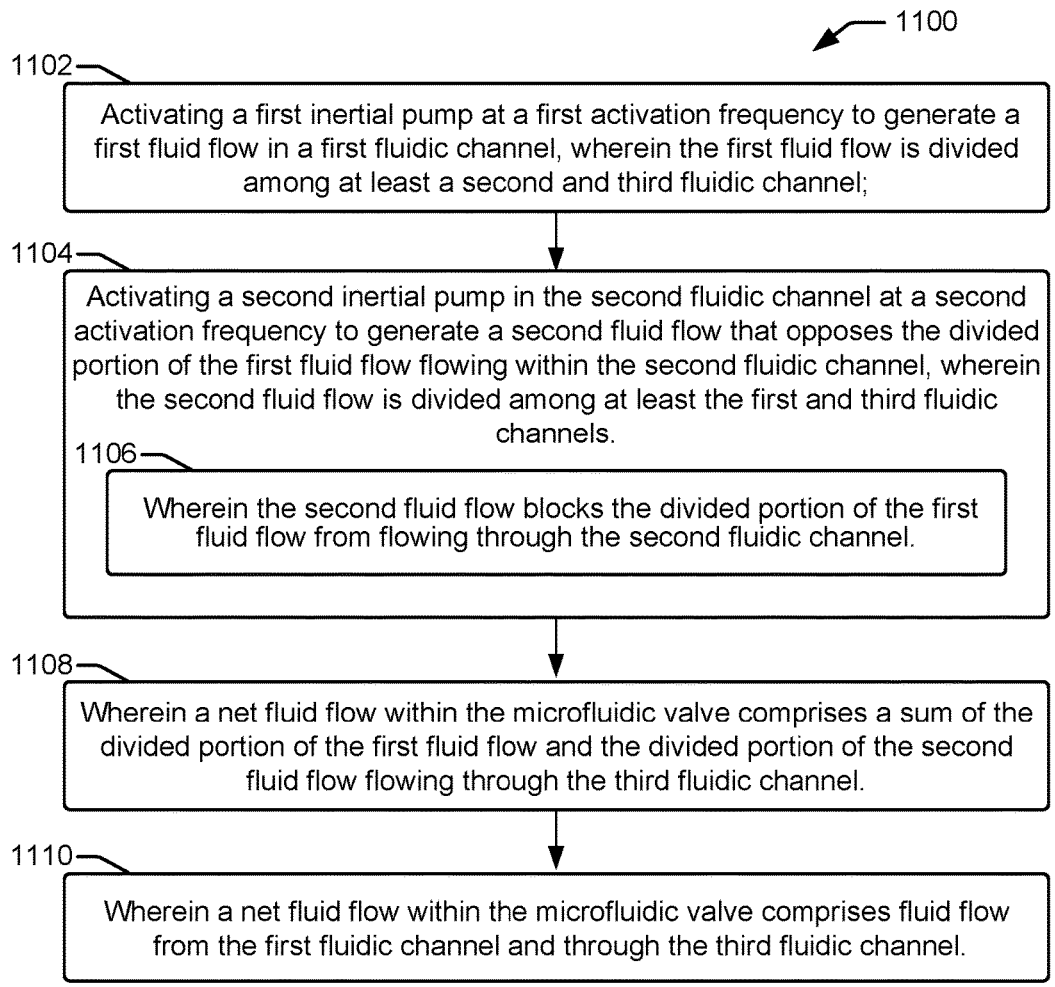

FIGS. 10 and 11 show flow diagrams that illustrate example methods 1000 and 1100, related to a microfluidic valve that uses frequency control of inertial pumps to control the flow of fluid through microfluidic channels. Methods 1000 and 1100 are associated with the examples discussed above with regard to FIGS. 1-9, and details of the operations shown in methods 1000 and 1100 can be found in the related discussion of such examples. The operations of methods 1000 and 1100 may be embodied as programming instructions stored on a non-transitory, machine-readable (e.g., computer/processor-readable) medium, such as memory 904 of actuator 101 as shown in FIG. 9. In some examples, implementing the operations of methods 1000 and 1100 can be achieved by a processor, such as processor 902 of FIG. 9, reading and executing the programming instructions stored in memory 904. In some examples, implementing the operations of methods 1000 and 1100 can be achieved using an ASIC (application specific integrated circuit) and/or other hardware components alone or in combination with programming instructions executable by processor 902.

Methods 1000 and 1100 may include more than one implementation, and different implementations of methods 1000 and 1100 may not employ every operation presented in the respective flow diagrams. Therefore, while the operations of methods 1000 and 1100 are presented in a particular order within the flow diagrams, the order of their presentation is not intended to be a limitation as to the order in which the operations may actually be implemented, or as to whether all of the operations may be implemented. For example, one implementation of method 1000 might be achieved through the performance of a number of initial operations, without performing one or more subsequent operations, while another implementation of method 1000 might be achieved through the performance of all of the operations.

Referring now to the flow diagram of FIG. 10, an example method 1000 of controlling a microfluidic valve 100 begins at block 1002, with activating a first inertial pump at a first frequency, and a second inertial pump at a second frequency to create a first fluid flow pattern within a microfluidic valve. At block 1004, the method continues with adjusting at least one of the first frequency and the second frequency to change the first fluid flow pattern to a second fluid flow pattern. Referring back to block 1002, in some examples, activating an inertial pump at a frequency comprises implementing a time delay between each activation of an inertial pump to enable a pumping event caused by the activation to be completed before a subsequent activation is initiated as shown at block 1006. As shown at block 1008, in some examples, activating the first inertial pump creates a first fluid flow, and activating the second inertial pump creates a second fluid flow to oppose the first fluid flow. In some examples of this circumstance, as shown at block 1010, the second fluid flow stops the first fluid flow from flowing through a fluidic channel in which the second inertial pump is located. In other examples, as shown at block 1012, the second fluid flow reduces an amount of the first fluid flow flowing through a fluidic channel in which the second inertial pump is located.

Referring now to the flow diagram of FIG. 11, an example method 1100 related to controlling a microfluidic valve 100 begins at block 1102, with activating a first inertial pump at a first activation frequency to generate a first fluid flow in a first fluidic channel, wherein the first fluid flow is divided among at least a second and third fluidic channel. The method 1100 continues at block 1104 with activating a second inertial pump in the second fluidic channel at a second activation frequency to generate a second fluid flow that opposes the divided portion of the first fluid flow flowing within the second fluidic channel, wherein the second fluid flow is divided among at least the first and third fluidic channels. In some examples, as shown at block 1106, the second fluid flow blocks the divided portion of the first fluid flow from flowing through the second fluidic channel. As shown at block 1108, in some examples, a net fluid flow within the microfluidic valve comprises a sum of the divided portion of the first fluid flow and the divided portion of the second fluid flow flowing through the third fluidic channel. As shown at block 1110, in some examples, a net fluid flow within the microfluidic valve comprises fluid flow from the first fluidic channel and through the third fluidic channel.

What is claimed is:

1. A method of controlling a microfluidic valve comprising:
   activating a first inertial pump at a first frequency and activating a second inertial pump at a second frequency to create a first fluid flow pattern within a microfluidic valve; and
   adjusting at least one of the first frequency and the second frequency to change the first fluid flow pattern to a second fluid flow pattern, wherein a ratio of said activation frequencies is adjusted to dynamically control the flow of fluid within the valve.

2. A method as in claim 1, wherein activating an inertial pump at a frequency comprises implementing a time delay between each activation of an inertial pump to enable a pumping event caused by the activation to be completed before a subsequent activation is initiated.

3. A method as in claim 1, wherein activating the first inertial pump creates a first fluid flow and activating the second inertial pump creates a second fluid flow to oppose the first fluid flow.

4. A method as in claim 3, wherein the second fluid flow stops the first fluid flow from flowing through a fluidic channel in which the second inertial pump is located.

5. A method as in claim 3, wherein the second fluid flow reduces an amount of the first fluid flow flowing through a fluidic channel in which the second inertial pump is located.

6. A microfluidic valve comprising:
   at least three channels coupled to and extending at angles away from a channel intersection, each channel coupled to the channel intersection at a first channel end; a
   an inertial pump located within each channel toward a second channel end, opposite the first channel end; and
   an actuator configured to set a ratio of activation frequency between at least two of the inertial pumps that generates a first fluid flow pattern through the channels.

7. A microfluidic valve as in claim 6, wherein the ratio of activation frequency comprises a variable ratio that is adjustable to generate different fluid flow patterns within the channels.

8. A microfluidic valve as in claim 6, wherein the first fluid flow pattern comprises a pattern in which fluid flow through one of the channels is blocked.

9. A microfluidic valve as in claim 6, wherein the first fluid flow pattern comprises a pattern in which fluid flow through one of the channels is reduced.

10. A microfluidic valve as in claim 6, wherein the channels are of equal length and the angles are equal angles.

11. A microfluidic valve as in claim 6, wherein the actuator comprises a time interval module to enable an adjustment to a time interval between each activation of an inertial pump.

12. A non-transitory machine-readable storage medium storing instructions executable by a processor of an actuator on a microfluidic valve, wherein the processor is programmed to cause the actuator to:
   in a first fluidic channel, activating a first inertial pump at a first activation frequency to generate a first fluid flow, wherein the first fluid flow is divided among at least a second and third fluidic channel; and
   in the second fluidic channel, activating a second inertial pump at a second activation frequency to generate a second fluid flow that opposes the divided portion of the first fluid flow flowing within the second fluidic channel, wherein the second fluid flow is divided among at least the first and third fluidic channels.

13. A non-transitory machine-readable storage medium as in claim 12, wherein the second fluid flow blocks the divided portion of the first fluid flow from flowing through the second fluidic channel.

14. A non-transitory machine-readable storage medium as in claim 13, wherein a net fluid flow within the microfluidic valve comprises a sum of the divided portion of the first fluid flow and the divided portion of the second fluid flow flowing through the third fluidic channel.

15. A non-transitory machine-readable storage medium as in claim 13, wherein a net fluid flow within the microfluidic valve comprises fluid flow from the first fluidic channel and through the third fluidic channel.

* * * * *

UNITED STATES PATENT AND TRADEMARK OFFICE
CERTIFICATE OF CORRECTION

PATENT NO. : 10,197,188 B2
APPLICATION NO. : 15/503664
DATED : February 5, 2019
INVENTOR(S) : Alexander Govyadinov et al.

Page 1 of 1

It is certified that error appears in the above-identified patent and that said Letters Patent is hereby corrected as shown below:

In the Claims

In Column 10, Lines 32-33, Claim 6, delete "a an" and insert -- an --, therefor.

Signed and Sealed this
Eighteenth Day of June, 2019

Andrei Iancu
*Director of the United States Patent and Trademark Office*